Sept. 2, 1924.
W. MINTHORN
1,506,915
LOCKING DIFFERENTIAL FOR AUTOMOBILES
Filed July 24, 1922    2 Sheets—Sheet 2
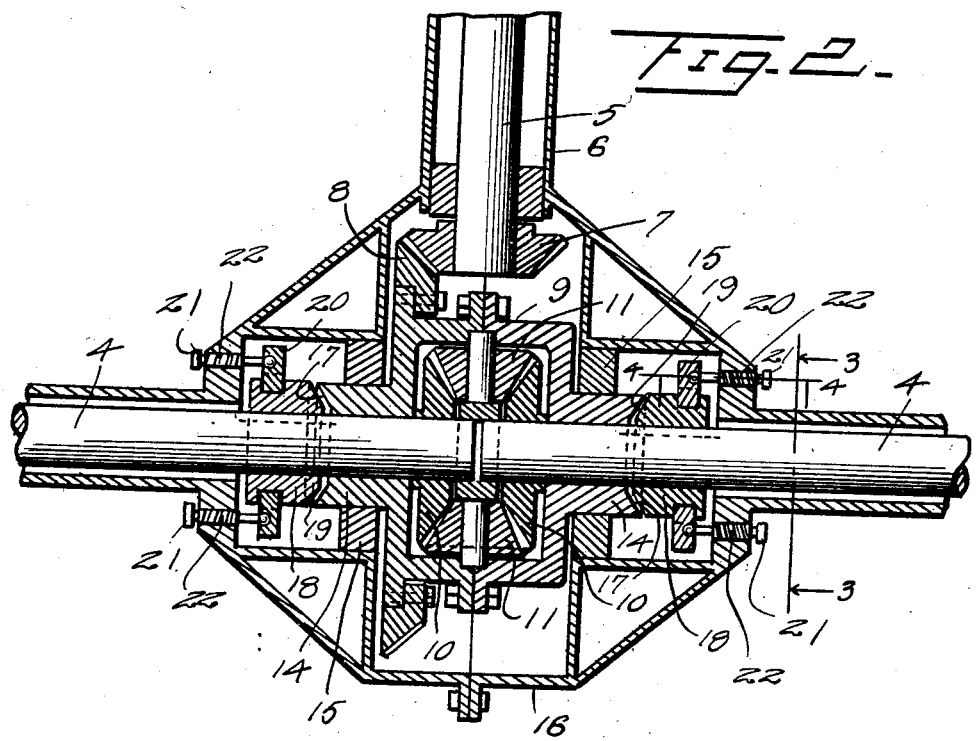
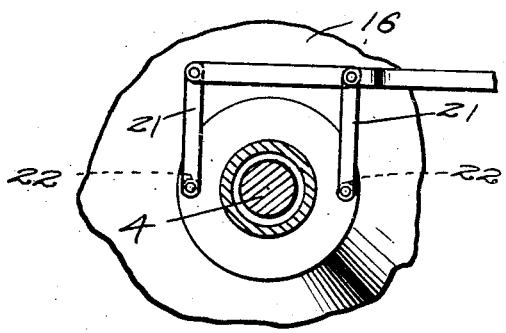
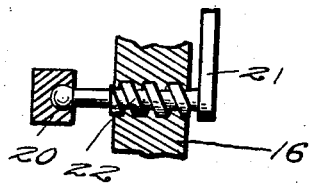
Inventor
Wallace Minthorn
By William J. Jacobi
Attorney Patented Sept. 2, 1924.

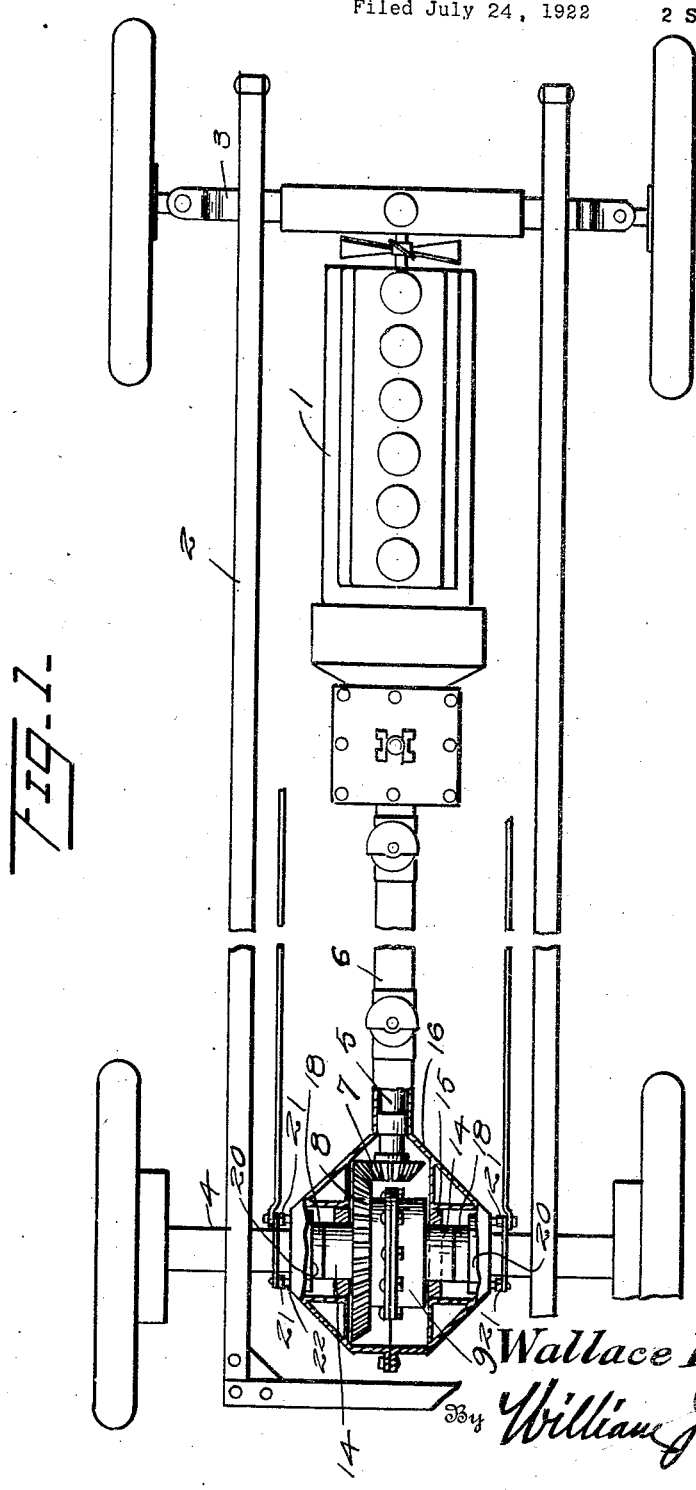

1,506,915

UNITED STATES PATENT OFFICE.

WALLACE MINTHORN, OF MILLERSBURG, MICHIGAN.

LOCKING DIFFERENTIAL FOR AUTOMOBILES.

Application filed July 24, 1922. Serial No. 577,174.

*To all whom it may concern:*

Be it known that I, WALLACE MINTHORN, a citizen of the United States, residing at Millersburg, in the county of Presque Isle and State of Michigan, have invented certain new and useful Improvements in Locking Differentials for Automobiles, of which the following is a specification.

This invention relates to locking mechanism for the differential of an automobile, and has for its primary object to provide means whereby both or either of the ends of the drive axle may be locked in engagement with the driving shaft for driving both or either of the rear wheels at the same time.

A further object of the invention is to provide an operating mechanism for the differential of an automobile, whereby in making a turn around a corner, the inner wheel and end of the drive axle may be thrown out of engagement with the drive shaft, while the outer or opposite wheel and end of the axle may be brought in engagement with the drive shaft, so that the power of driving around a corner is on the outer wheel, which eliminates the strain usually placed on the differential, as it is a well known fact that the outer wheel has to travel considerably greater distance than the inner wheel, which causes a severe strain to the differential.

And a still further object of my invention is to provide an improved locking means for connecting the outer ends of each axle with the driving gears, and having said means operated by a foot pedal under control of the operator of the car, thus allowing the hands to be free in the operation of the machine.

An additional object of the invention is to provide a locking device, which is simple in construction, durable, efficient for the purpose intended, and one that can be manufactured at a relatively low cost.

These and like objects of the invention will be better understood as the description follows and as is specifically pointed out in the appended claim.

Referring to the accompanying drawing which forms a part of this specification and which clearly illustrates the construction and operation of my locking the device.

Figure 1 is a plan view of a portion of a chassis of a motor vehicle, with the axle housing partly broken away to show the embodiment of my invention.

Figure 2 is a detail of the portion of the structure shown in Fig. 1.

Figure 3 is an enlarged fragmentary sectional view of the drive shaft and the clutch operating mechanism for locking the differential.

Figure 4 is a detail sectional view on line 4—4 of Fig. 3.

Referring to the drawing in detail, like numerals will be used to designate like parts in the different views.

In the drawing, the numeral 1 indicates the motor, in the embodiment illustrated, an internal combustion engine being shown. This motor is supported upon a frame 2 which is in turn supported upon a steering axle 3 and a driving axle 4, both axles having wheels, as shown.

The numeral 5 indicates a propeller shaft, positioned in a propeller shaft housing 6 and mounted on the free end of the propeller shaft is a drive pinion 7, which is adapted to mesh with a ring gear 8 carried by the differential gear case 9. The gear case 9 carries the bevel gears 10, which mesh with the differential pinions 11, the latter being substantially supported in the upper and lower portions of the gear casing respectively as clearly shown in Fig. 2 of the drawings.

Each of the ends of the gear case 9 is provided with hubs 14, which are supported by the collars 15 and by the housing 16. The free ends of the hubs 14 are provided with a conical face 17, adapted to receive therein a sliding clutch 18 carried by the sectional drive axle 4. The clutches 18 are keyed to the drive axle in any suitable manner and each of the clutches 18 are provided with a cone-shaped end 19 for engagement with the conical-shaped ends 17 of the hubs. The cone-shaped clutches 18 are provided with collars 20 to which are connected operating levers 21 having screw threaded bodies 22 which pass through the housing 16. The levers 21 are connected in any suitable manner with foot pedals, so that upon forward movement of the foot pedals, the levers 21 are adapted to be rotated and by means of the screw threads 22 in the housing, the cone-shaped clutches are moved into engagement with the hubs formed on the gear case, so that both or either one of the cones can be brought into engagement with the hubs or hub, or as hereinbefore stated if making a turn around a corner, one of the clutches can be thrown out of engagement with the end of the hub, while the clutch on the outer end of the outside axle can be thrown into engagement with the hub of the gear case, thus placing the driving action on the outside wheel. It is to be understood that each of the cone-shaped clutches 18 are connected to a separate foot pedal, not shown.

In view of the foregoing description of my invention taken in connection with the accompanying drawing, it is believed that any further explanation as to the operation, construction and objects of same are unnecessary.

While I have shown and described the preferred form of my invention, I realize that various minor changes may be resorted to, without departing from the spirit and scope of the invention as claimed, therefore, I do not wish to limit myself to the exact details of construction shown, nor to the combination and arrangement of parts.

What I claim as new and desire to secure by Letters Patent is:—

In a locking device, the combination of a divided driven shaft, differential gearing connecting the sections of the driven shaft, including a casing, the latter having hub portions provided on the outer ends thereof, means for rotating said casing, a housing for said casing and said sections of said driven shaft, conical-shaped clutch engaging faces formed on the outer ends of said hub portions, a sliding conical-shaped clutch keyed to each section of the divided driven shaft and adapted for engagement with the conical-shaped face of each of said hub portions, means for actuating said clutches comprising screw threaded levers mounted for rotary movement in said housing, and connected at one end to each of the clutches, the opposite ends being connected to foot pedals.

In testimony whereof I affix my signature.

WALLACE MINTHORN.